Patented July 1, 1924.

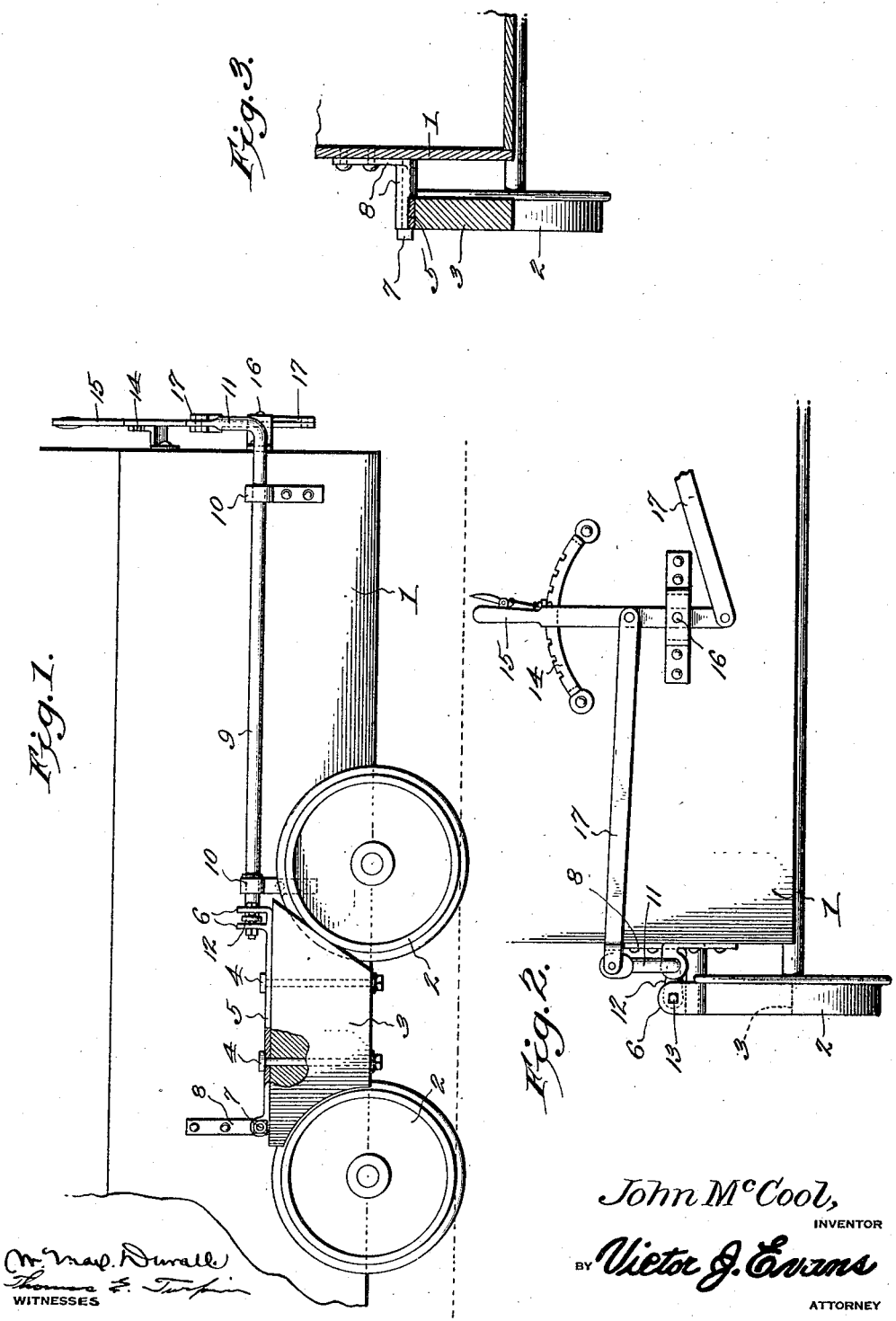

1,499,674

UNITED STATES PATENT OFFICE.

JOHN McCOOL, OF LILLY, PENNSYLVANIA.

MINE-CAR BRAKE.

Application filed April 9, 1923. Serial No. 630,899.

*To all whom it may concern:*

Be it known that I, JOHN McCOOL, a citizen of the United States, residing at Lilly, in the county of Cambria and State of Pennsylvania, have invented new and useful Improvements in Mine-Car Brakes, of which the following is a specification.

The object of my said invention is the provision of a simple, easily operated and powerful brake, designed more especially, though not necessarily, for use on mine cars.

To the attainment of the foregoing, the invention consists in the improvement as hereinafter described and definitely claimed.

In the accompanying drawings, forming part of this specification:—

Figure 1 is a side elevation showing a portion of a mine car equipped with my novel brake.

Figure 2 is a rear end elevation of the brake and car.

Figure 3 is a detail cross-section.

Similar numerals of reference designate corresponding parts in all of the views of the drawings.

The car body 1 may be of the ordinary construction or of any other construction compatible with the practice of my invention, and the wheels 2 are connected with the bed of the car.

In accordance with my invention I provide between the wheels 2 a wedge-shaped block 3 susceptible of vertical movement, said block 3 being preferably of wood though without departure from the scope of my invention it may be formed of any other material compatible with its purpose.

Disposed above the block 3 and connected by bolts 4 or otherwise thereto is a saddle member 5 having an upstanding bifurcated portion 6 at its rear end. The forward end of the saddle member 5 is pivotally connected at 7 to the car body 1 on a hanger 8, and from this it follows that when the rear end of the block 3 is raised the wheels 2 will be free of braking pressure, while when the block 3 is lowered or moved downwardly under pressure the said wheels 2 will be subjected to a powerful braking action which will practically lock the wheels against rotation.

For the manipulation and control of the brake block 3, I provide a longitudinal shaft 9 journaled in appropriate bearings 10 on the body 1 and having at its rear end a crank arm 11 and at its forward end a crank arm 12, the said arm 12 being pivotally connected by a bolt 13 to the spaced arms of the bifurcated portion 6 of the saddle 5.

At 14 on the rear of the body 1 is a segmental rack for cooperation with a lever 15, the said lever 15 being fulcrumed at 16 and being connected through rods 17 with the arms 11 of the brakes at opposite sides of the car, it being understood in this connection that the brake shown in Figure 1 is duplicated at the opposite side of the car for cooperation with the wheels 2 at said opposite side of the car.

Manifestly in virtue of the construction described an operator positioned behind a car is enabled to quickly and strongly brake the car and secure the brakes in set position so as to effectively lock the car against casual movement. It will also be manifest that when it is desired to release the brakes it is simply necessary for the operator to release the lever 15 from the rack 14 and then move the lever 15 in reverse direction to raise the blocks 3. I would also have it understood that when desired the lever 15 may be adjustably fixed with respect to the segmental rack 14 so as to maintain the blocks 3 in a slightly raised position, thereby preventing the blocks from interfering with free rotation of the wheels 2.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. The combination in a brake, of spaced car wheels, a car body, and a vertically swingable wedge-shaped block interposed between and movable vertically relative to the treads of the wheels, the said block being pivotally connected adjacent to one of its ends, and being associated at its opposite end with means for swinging the block vertically on the said pivot.

2. In a brake, the combination of a car body, spaced wheels, a vertically swingable wedge-shaped block interposed between the treads of the wheels, a saddle connected to the said block and pivotally connected at one end to the car body and having an upstanding portion adjacent to its opposite end, a longitudinal shaft having a crank arm pivotally connected to the upstanding portion of the saddle and also having a crank arm at its opposite end, a lever connected with the latter arm and mounted on the car body and swingable in parallelism to one end of said body, and means for adjustably fixing the said lever.

3. The combination of a car body, spaced wheels at opposite sides thereof, vertically swingable wedge-shaped blocks at opposite sides of the body and between the wheels, the said blocks pivotally connected at one end to the body, longitudinal shafts carried by the body and having crank arms at opposite ends, the inner arms connected with the blocks, a rack on the body and parallel to one end thereof, a lever mounted on the body and arranged to cooperate with said rack and swingable in parallelism to one end of the body, and rods at opposite sides of the center of movement of the lever and connecting said lever and the outer arms of the longitudinal shafts.

In testimony whereof I affix my signature.

JOHN McCOOL.